(12) United States Patent
Li et al.

(10) Patent No.: US 7,097,315 B2
(45) Date of Patent: Aug. 29, 2006

(54) POLARIZATION CONVERSION AND RECYCLING METHOD AND APPARATUS

(75) Inventors: Haizhang Li, Orlando, FL (US); Bujin Guo, Houston, TX (US); Xiaodan Li, Orlando, FL (US)

(73) Assignee: Microsensor Technology, Orlando, FL (US)

( * ) Notice: Subject to any disclaimer, the term of this patent is extended or adjusted under 35 U.S.C. 154(b) by 0 days.

(21) Appl. No.: 10/249,356

(22) Filed: Apr. 2, 2003

(65) Prior Publication Data

US 2004/0090763 A1    May 13, 2004

Related U.S. Application Data

(60) Provisional application No. 60/424,171, filed on Nov. 7, 2002.

(51) Int. Cl.
*F21V 5/02* (2006.01)
*F21V 7/04* (2006.01)

(52) U.S. Cl. .......................... 362/19; 359/496

(58) Field of Classification Search ............... 359/834, 359/836, 831, 485, 483, 494, 496, 487, 488, 359/529, 531–533; 362/19, 311, 327, 331, 362/332, 337, 346, 297, 298; 356/493, 487
See application file for complete search history.

(56) References Cited

U.S. PATENT DOCUMENTS 3,876,285 A * 4/1975 Schwarzmuller ............ 359/487
5,300,062 A * 4/1994 Ueno ............................ 606/4
5,428,469 A * 6/1995 Willett ......................... 349/9
5,777,788 A * 7/1998 Noguchi ..................... 359/487
5,884,991 A * 3/1999 Levis et al. ................ 353/122
6,839,095 B1 * 1/2005 Bierhuizen et al. ............ 349/9
6,962,426 B1 * 11/2005 Slobodin .................... 362/298
7,009,711 B1 * 3/2006 Hill ............................. 356/493

\* cited by examiner

*Primary Examiner*—Sharon Payne

(57) ABSTRACT

A method, apparatus and system for polarization conversion and recycling by using a half-pyramid shaped reflector with multiple reflective surfaces, or said reflector assembly, to obtain a desirable polarization rotation effect. The disclosed half-pyramid reflector comprises a plurality of reflective surfaces, which are formed so that an incoming beam passing perpendicularly through the entrant surface is reflected three times inside the device and leaves the exit surface with the direction of polarization being rotated 90 degrees. The preferred embodiments of polarization:conversion systems using the invented apparatus are included. Without employing any waveplate component, the disclosed system is not sensitive to wavelength variations of the light source, temperature changes, and polarization alignment errors. Typical application of this invention includes polarization conversion and recycling for projection systems with polarization dependent spatial light modulation panels, such as LCD (Liquid Crystal Display) and LCOS (Liquid Crystal On Silicon).

3 Claims, 14 Drawing Sheets

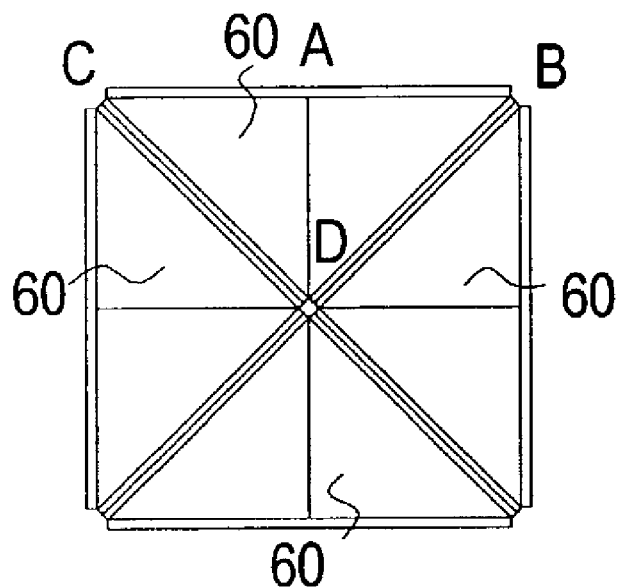
FIG. 8(a)  FIG. 8(b)
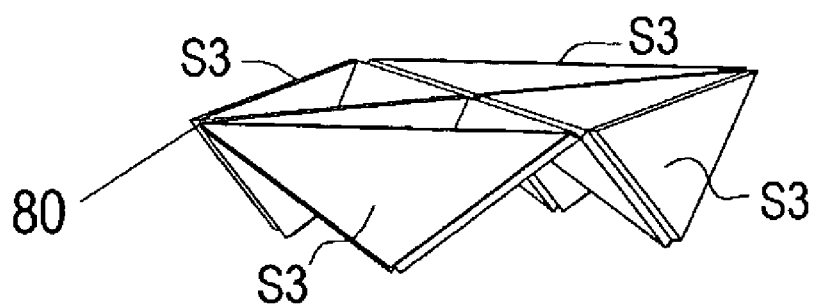
FIG. 8(c)

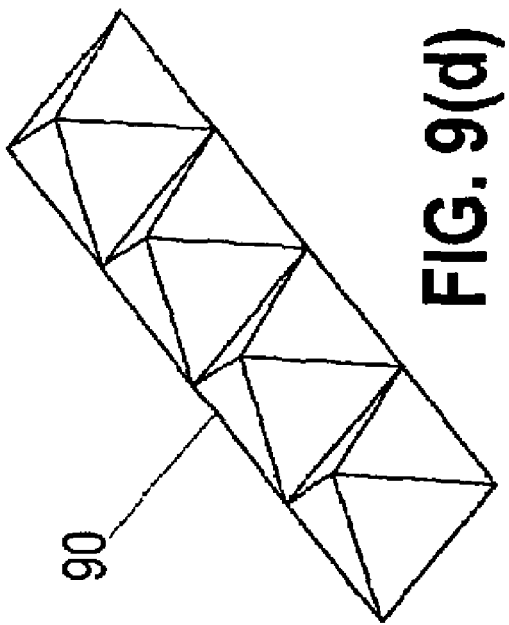
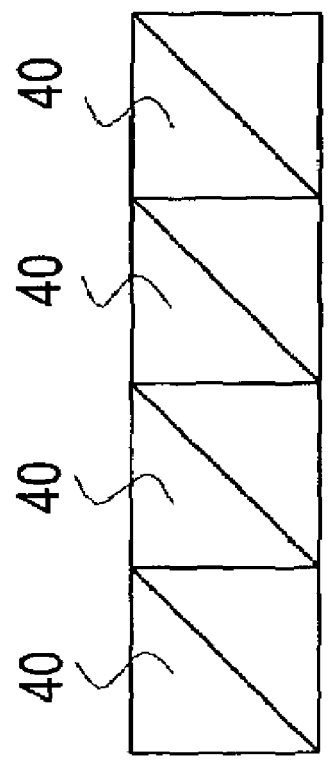

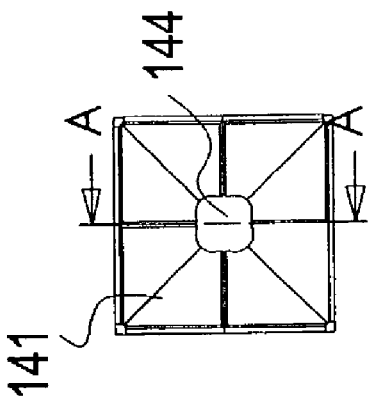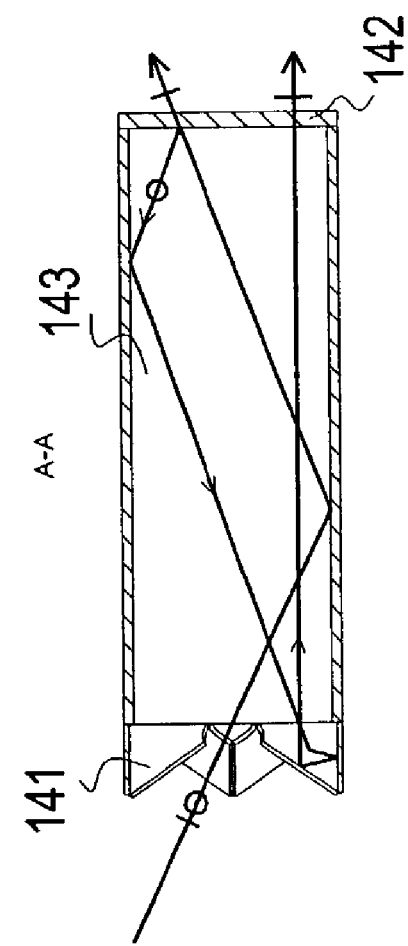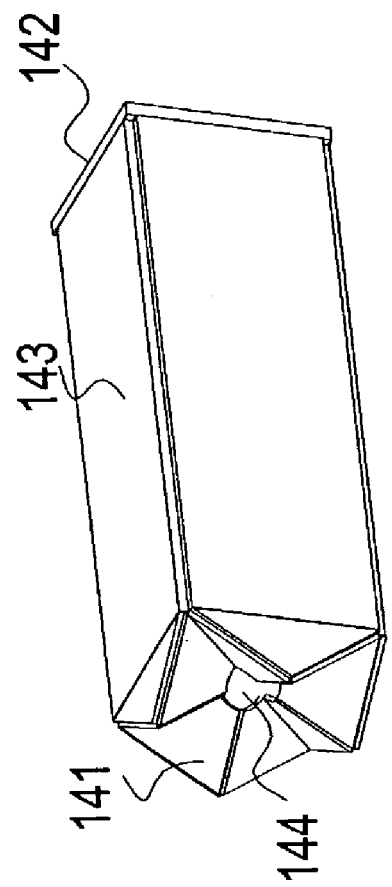
FIG. 14(a)
FIG. 14(b)
FIG. 14(c)

POLARIZATION CONVERSION AND RECYCLING METHOD AND APPARATUS

CROSS REFERENCE TO RELATED APPLICATIONS

This application is in-part a continuation of the U.S. provisional Patent Application Ser. No. 60/424,171 filed Nov. 7, 2002, entitled "Polarization conversion and recycling method and apparatus".

BACKGROUND OF INVENTION

1. Field of the Invention

The present invention relates generally to a polarization conversion and recycling method that features a polarization converting apparatus using a uniquely designed half-pyramid shaped reflector with multi-reflection to achieve a desirable polarization rotation function. The present invention further relates to polarization conversion and recycling systems using the same.

2. Description of the Prior Art

Polarized light sources are utilized in various applications such as LCD (Liquid Crystal Display) and LCOS (Liquid Crystal On Silicon) projection systems. Un-polarized light source can be decomposed by a polarizing beam splitter (PBS) into a linear s-polarization component and an orthogonal p-polarization component.

A commonly used method of producing polarized light for a LCD projection panel comprises the use of a PBS prism cube or a reflective PBS plate to separate s and p polarized beams into reflection and transmission, respectively. One linearly polarized component of the light is transmitted by the PBS and directed to the LCD panel, while the orthogonal component is reflected away in different direction. The regular PBS could only be used near 45 degrees incidence with small numerical aperture. Another kind of PBS, the wire grid PBS, has attracted special interest because it can be used in a perpendicular incidence with large angle incident cone, as disclosed in U.S. Pat. No. 6,208,463 and U.S. Pat. No. 6,243,199.

It is evident that conventional reflective polarizers with no polarization conversion and recycling device attached are inefficient, due to the fact that, during s-p polarization split, severe loss of light occurs and only a maximum of one-half of the available light from the source can be converted to polarized light for transmission.

Many efforts have been made to increase the efficiency of polarization conversion and the results can be found in the prior arts and commercial products. Some of the polarizing converting systems incorporate a waveplate with polarizing beam splitter to make use of both polarizations. For example, by introducing a half waveplate, one could convert a p-beam into a s-beam or vice versa to recover otherwise wasted component. A mirror or a prism has to be employed to reflect the converted beam in the same direction as the other beam does. Examples can be found in U.S. Pat. No. 6,046,856 and U.S. Pat. No. 5,884,991.

Another commonly proposed approach involves the implementation of units that incorporate a plurality of prisms arranged in an array with PBS coating or reflecting surfaces formed between the prisms. Light from the source is directed towards the prisms by a multi-lens optical array. One polarization is passed directly through the prisms while the other polarization is directed sideways towards the mirror surfaces between the prisms. Mirrors redirect the other polarization again into the useful beam. Waveplate strips, arranged on the exiting surfaces, rotate the other polarization so that it is the same as the passed polarization. The width of the elements in the lens array is twice the width of the PBS prism elements so that the structure can make full use of the illumination area. Implementations of such mechanism can be found in U.S. Pat. No. 6,337,759 and U.S. Pat. No. 6,154,320.

In summary, previous work shows that almost all current polarization conversion systems have to utilize half-wave or quarter-wave phase retardation plates to increase conversion efficiency. However, the methodology of employing waveplates in a polarization converter inevitably leads to some problems. One of the disadvantages is that the waveplates will not work properly if the wavelengths of the illumination beam deviate considerably from the center wavelength. Another disadvantage is that the waveplates are sensitive to changes of the incident angles and the direction of polarization. Furthermore, a waveplate made of polymer is thermally unstable, while although a waveplate made of crystal can tolerate high temperature and rapid temperature change, its cost is usually too high. These issues have restricted the use of waveplate in some practical applications, particularly in those applications where working with a high flux of broadband light and/or a high operation temperature is unavoidable.

In some literature from the prior arts, a variety of proposals have been made to achieve polarization rotation and conversion by using prisms. Among them, U.S. Pat. No. 4,822,150 disclosed an optical device for rotating the polarization of a light beam. In one embodiment of the invention, the device comprises a prism, which is adapted to rotate the polarization of a linearly polarized beam of radiation by 90 degrees and the propagation direction of beam is altered by 90 degrees. U.S. Pat. No. 4,252,410 disclosed a method and apparatus for rotating the polarization vector of a substantially linearly polarized beam through a selected angle by using three or four reflections with the output beam being substantially free of ellipticity. U.S. Pat. No. 5,751,482 disclosed an achromatic polarization rotating right angle prism system for rotating the plane of polarization by 90 degrees. The direction of travel of the beam may be altered by 90 degrees or the beam may continue on in the same line. These findings and derived systems are often too complicated to be used in practical polarization applications.

U.S. Pat. No. 5,777,788 presented a prism polarizer, in the form of a pyramid with its apex located on a line normal to the bottom surface at one of the four corner points, to convert unpolarized light into linearly polarized components without using a half wave plate. The prism polarizer is comprised of two reflecting surfaces and a polarization beam splitting surface (PBS surface) which lies in a bisectional plane of two reflecting surfaces. One of the side surfaces of the pyramid which are in the form of right-angled isosceles triangles defines the light incident surface, and a square bottom surface defines the light emission surface.

The unpolarized light incident upon the light incident surface, passes though the PBS surface and is split by the PBS surface. One p-polarized light component, transmitted through the PBS surface, is reflected by the first reflecting surface toward the light emission surface; and the s-polarized light component, reflected by the PBS, is reflected at right angles by the second reflecting surface toward the light emission surface. Thus, the s-polarized light component is emitted in the same polarization direction and propagates in the same direction as the P-polarized light component. The disclosed device is not only a polarizer to convert unpolarized light to polarized light but also a polarization rotation device to change the direction of polarization.

However, the disclosed prism polarizer is not very suitable for many applications due to its triangular shaped incident surface. To overcome this drawback, the inventor demonstrated a rather sophisticated embodiment by using two prism polarizers adhered together to form a square incident surface, and at least one optical component needs to be added in order to keep light emissions from two prisms propagating in the same direction. Due to its potential complexity, again, this configuration is not very practically useful for many real applications.

To address the problems and drawbacks in prior art polarization conversion systems, the current invention introduces a unique polarization rotation apparatus of a half-pyramid shaped reflector, either a half-pyramid shaped prism reflector or a half-pyramid shaped hollow reflector, which can be assembled and integrated in a polarization conversion system to achieve the required polarization rotation, conversion and recycling without using a wave plate. Compared to polarization rotation devices in the prior art which are utilizing wave plates, the invented polarization rotation apparatus has advantage of not being sensitive to wavelength variation of the light source, to temperature changes and to polarization alignment errors. Compared to other prism-based polarization rotation devices disclosed in the prior art, the invented polarization rotation apparatus has advantage of simplicity in structure, compactness in size, and flexibility to be assembled in various configurations.

SUMMARY OF INVENTION

The primary objective of the present invention is to provide polarization rotation and converting devices and systems for rotating the direction of polarization of the incoming beam and efficiently converting the otherwise wasted polarizing beam from a light source into the wanted polarization.

It is yet another objective of the present invention to provide a reflector apparatus for polarization rotation, which is not sensitive to wavelength variations of the light source.

It is yet another objective of the present invention to provide a reflector apparatus for polarization rotation, which is not sensitive to temperature changes.

It is yet another objective of the present invention to provide a reflector apparatus for polarization rotation, which is not sensitive to polarization alignment errors.

It is yet another objective of the present invention to provide a polarization recovery system without any waveplate employed.

It is a further objective of the present invention to provide a polarization recovery apparatus and systems for use in image projection, light projection and other display applications.

To achieve the above objectives, the present invention discloses an apparatus of a half-pyramid shaped reflector, comprising three reflective surfaces, not mutually perpendicular, but formed at such angles that the incoming beam perpendicularly passing through the entrant surface is reflected three times inside said reflector and leaves the exit surface with the direction of polarization being rotated 90 degrees.

Several preferred sample embodiments are disclosed by integrating or combining said apparatus into different optical arrangements, each configuration comprising one or more said apparatus of half-pyramid shaped reflector, such as, said reflector with triangular entrance/exit surface, an assembly of two said reflectors with square entrance/exit surface, a strip of said reflectors, and an array of said reflectors. The disclosed polarization converting system has the advantage of high converting efficiency, stability at high light flux and tolerance to high temperature. Other advantages of the disclosed system, resulting from no waveplate employed in the disclosed system, include its insensitivity to wavelength variations of the light source, to temperature changes, and to polarization alignment errors.

In addition, for its simplicity in structure and ease in fabrication, the invented apparatus of half-pyramid shaped reflector and derived polarizing converter systems have substantial benefits over waveplate-dependent polarization conversion systems and are potentially useful in many polarization conversion applications. A typical application of this invention is to provide a polarized light source with improved efficiency for the projection systems utilizing polarization dependent spatial light modulation panels, either transmissive or reflective, such as LCD (Liquid Crystal Display) and LCOS (Liquid Crystal On Silicon). By further customizing and configuring the disclosed apparatuses, the disclosed method can encompass more embodiments and be adopted into more polarization converting systems, including the polarization systems where no polarization recovering device exists previously, and polarization conversion systems where the waveplate works as the key polarization converting and recycling component.

The other features and advantages of the present invention will become more evident from the following descriptions and the preferred embodiments as set forth hereinafter. For convenience of illustration, the abbreviation "HP" will be used to identify the Half-Pyramid structure of said reflector in the description thereafter.

BRIEF DESCRIPTION OF DRAWINGS

The detailed description, not intended to limit the present invention solely thereto, will best be understood in conjunction with the accompanying drawings, where similar elements will be represented by the same reference symbol, in which:

FIG. 2(a) shows a front view of the HP prism reflector thereof, FIG. 2(b) shows a side view of the apparatus in FIG. 2(a), FIG. 2(c) shows a top view of the apparatus in FIG. 2(a), and FIG. 2(d) shows a perspective view of the HP prism reflector thereof. The optical path inside the disclosed HP prism reflector is also shown in FIG. 2, for a beam perpendicularly incident to the entrance surface.

FIG. 3(a) is a front view of the HP prism reflector thereof, FIG. 3(b) is a side view of the apparatus in FIG. 3(a), FIG. 3(c) is a top view of the apparatus in FIG. 3(a), and FIG. 3(d) is a perspective view of the HP prism reflector thereof. FIG. 3(e) and FIG. 3(f) are cross-sectional views taken along lines E—E and F—F in FIG. 3(a), respectively.

FIG. 5(a) is a front view of said prism reflector assembly thereof. FIG. 5(b) is a side view of FIG. 5(a). FIG. 5(c) is a perspective view of said apparatus thereof.

FIG. 6(a) shows a front view of the HP hollow reflector thereof, FIG. 6(b) shows a side view of the apparatus in FIG. 6(a), FIG. 6(c) shows a top view of the apparatus in FIG. 6(a), and FIG. 6(d) shows a perspective view of the HP hollow reflector thereof.

FIGS. 8(a)–8(c) illustrate a variation on the embodiments of a polarizing converter with a square entrance/exit surface, which comprises four HP hollow reflectors as shown in FIG. 6. FIG. 8(a) is a front view of said hollow reflector assembly thereof. FIG. 8(b) is a side view of FIG. 8(a). FIG. 8(c) is a perspective view of FIG. 8(a) thereof.

FIGS. 9(a)–9(d) illustrate a schematic configuration of a polarizing converter with a strip shaped entrance/exit surface, which comprises a plural number of pyramid shaped HP assemblies. FIG. 9(a) shows a front view of the HP reflector strip thereof, FIG. 9(b) shows a side view of the apparatus in FIG. 9(a), FIG. 9(c) shows a top view of the apparatus in FIG. 9(a), and FIG. 9(d) shows a perspective view of the HP reflector strip thereof.

FIG. 10(a) shows a front view of the HP reflector array thereof, FIG. 10(b) shows a side view of the apparatus in FIG. 10(a), FIG. 10(c) shows a perspective view of the HP reflector array thereof.

FIG. 12(a) is a front schematic view of the system thereof. FIG. 12(b) is a perspective schematic view of the system shown in FIG. 12(a).

FIGS. 14(a)–14(c) present a schematic configuration for a polarization recycling system according to an embodiment of the invention, which includes a HP hollow reflector assembly as shown in FIG. 8, a reflective PBS plate and a light pipe integrator. FIG. 14(a) is a cross-sectional view of the system. FIG. 14(b) shows a side view of the system. FIG. 14(c) is a perspective schematic view of the system thereof.

DETAILED DESCRIPTION

The present invention is further described based on several sample embodiments, but embodiments of this invention are not limited to these examples. All embodiments demonstrate the usefulness of the invention and its versatility in a variety of polarization rotating, converting, and recycling applications.

Figure 1:
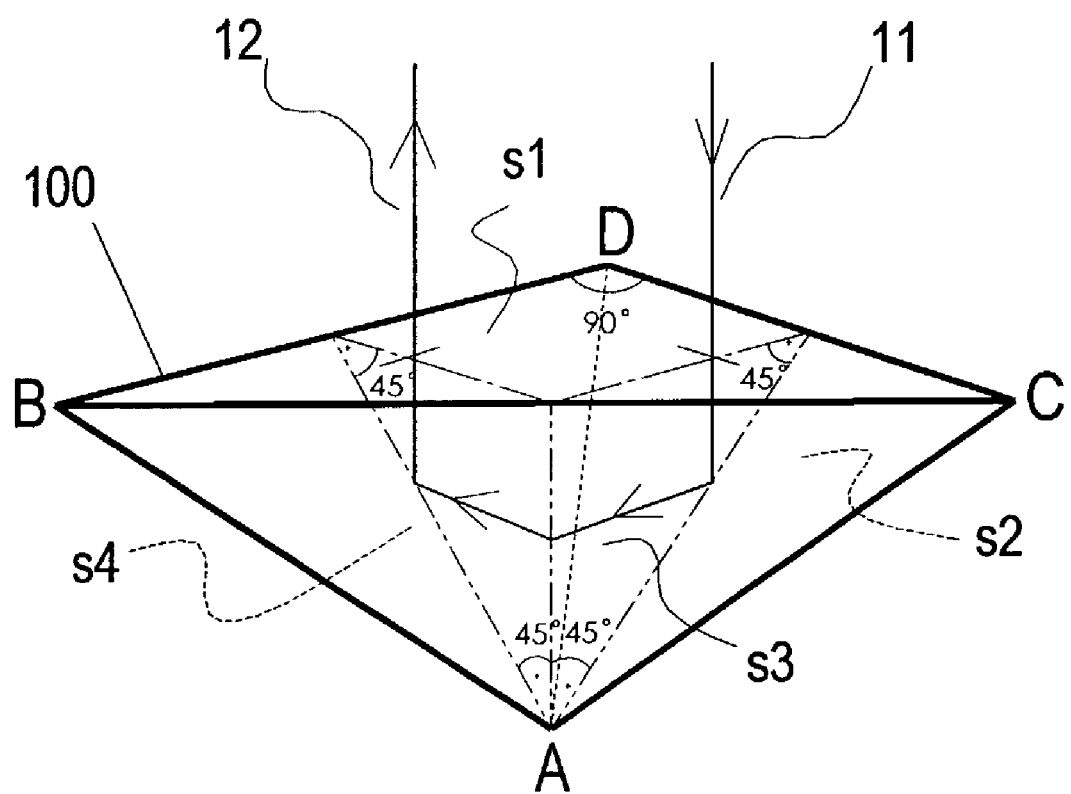
FIG. 1 is a perspective structural view of a model of the half pyramid reflector, illustrating the geometry and basic concept of operation of the invented apparatus.

FIG. 1 is a conceptual construction view showing a model of HP reflector, which comprises four triangular surfaces with four vertexes A, C, B, and D, wherein the surface s1 (BCD), in the shape of an isosceles right triangle, denotes the incident light entrance surface and light exit surface; the surface s2 (CDA), surface s3 (BAC) and surface s4 (DBA) denote three reflecting surfaces adjacent to each other. The reflecting surface s3 is perpendicular to the entrance/exit surface s1. The other two reflecting surfaces, surface s2 and surface s4, are both at a 45 degrees angle with respect to surface s1 to form a half-pyramid shaped reflector.

To illustrate the basic principle of the polarization rotation mechanism of said HP reflector, a linearly polarized beam 11, perpendicular to surface s1, is transmitted through s1 plane to reach the first reflective surface s2. The beam is continually reflected from the surface s2 to the second reflective surface s3. The surface s3 then reflects the beam to the third reflective surface s4. Finally, the surface s4 redirects the beam toward the surface s1. As the result of multiple reflections inside said reflector, the beam 12, exiting through the surface s1 in the reverse direction, has its polarization direction being rotated 90 degrees from the polarization direction of the incoming beam 11, as shown in FIG. 1.

Consequently, it can be derived that the linear polarized beam, perpendicularly entering on the left (or right) portion of the surface s1, being reflected three times internally in the HP reflector, will exit from the right (or left) portion of the surface s1 with the polarization direction being rotated by 90 degrees from the polarization direction of the incoming beam. Therefore, the characteristics of said HP reflector can be well used as a polarizing rotation apparatus for polarization conversion systems.

Figure 2A:
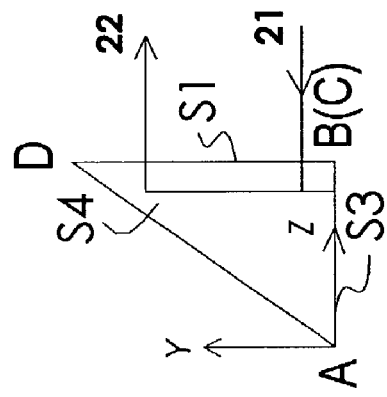
FIGS. 2(a)–2(d) present an embodiment of the invented half pyramid reflector shown in FIG. 1, illustrating the geometry and structure of a disclosed HP prism reflector.
Figure 2C:
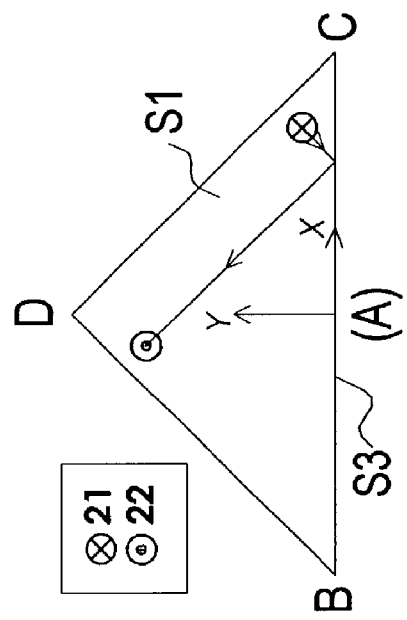
Figure 2B:
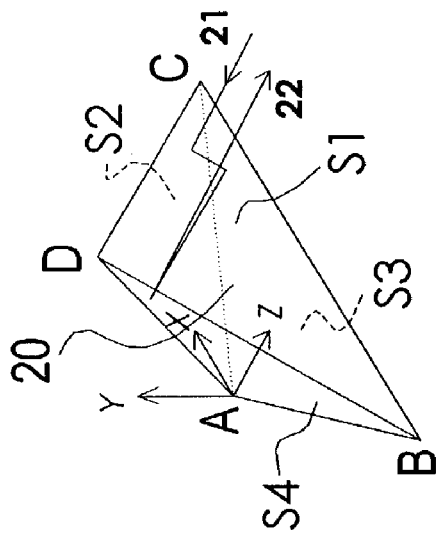
Figure 2D:
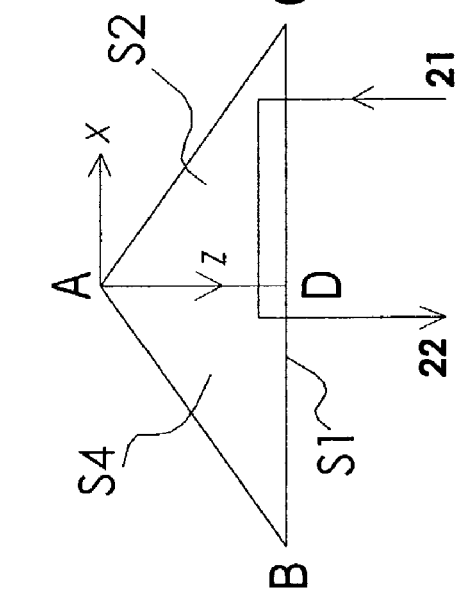

FIGS. 2(a)–2(d) present an embodiment of the invented half pyramid reflector shown in FIG. 1. FIG. 2(a) is a front view of the HP prism reflector 20, wherein the surface s1 (BCD) is the beam entrance/exit surface, in the shape of an isosceles right triangle. FIG. 2(b) is a side view of said HP prism reflector in FIG. 2(a), wherein the surface s3 (BAC) is a reflective surface perpendicular to the surface s1. FIG. 2(c) is a top view of said HP prism reflector wherein the triangular surface s4 (DBA) and s2 (CDA) are two reflective surfaces, both at a 45 degrees angle respect to surface s1. FIG. 2(d) is a perspective view of said HP prism reflector. Normally, the surfaces s2, s3 and s4 should have high reflection coatings and surface s1 should have anti-reflection coating.

The light path sequence for an incident beam perpendicular to the entrance surface s1 is also shown in FIG. 2. Cartesian coordinates X, Y are shown in FIG. 2 (a) and a Z-axis (not shown) perpendicular to the XY plane points out of the page. Cartesian coordinates Y, Z are shown in FIG. 2(b) with a X-axis (not shown) perpendicular to the YZ plane and pointing into the page. Cartesian coordinates X, Z are shown in FIG. 2(c) with a Y-axis (not shown) perpendicular to the XZ plane and pointing out of the page. The incident beam 21 normal to surface s1 is reflected three times inside the HP prism reflector 20, sequentially by surfaces s2, s3, and s4, and exits surface s1 in the reverse direction (denoted by beam 22). The arrow tail (a circle with a cross inside) in FIG. 2(a) denotes the beam entrance point on surface s1. The arrowhead (a circle with a dot in it) in FIG. 2(a) denotes the beam exit point on surface s1. It is concluded that, for a normal incident lineally polarized beam, the exiting beam from HP reflector has its polarization direction being rotated 90 degrees from the polarization direction of the incoming beam.

Figure 3B:
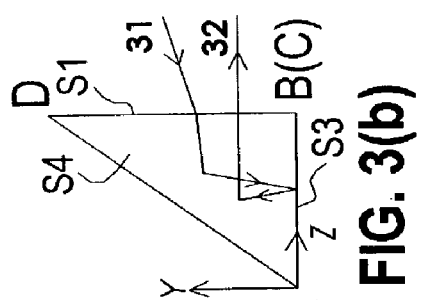
FIGS. 3(a)–3(f) are explanatory views to exhibit the optical path inside the invented HP prism reflector shown in FIG. 2, for an incident beam generally not perpendicular to the entrance surface. Similar to FIGS. 2(a)–2(d)
Figure 3E:
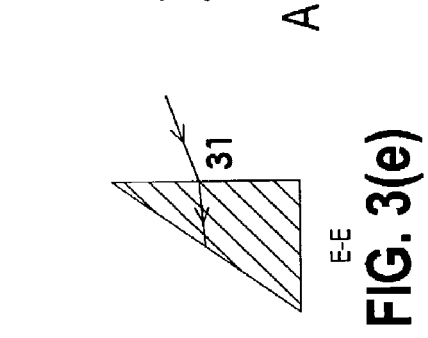
Figure 3D:
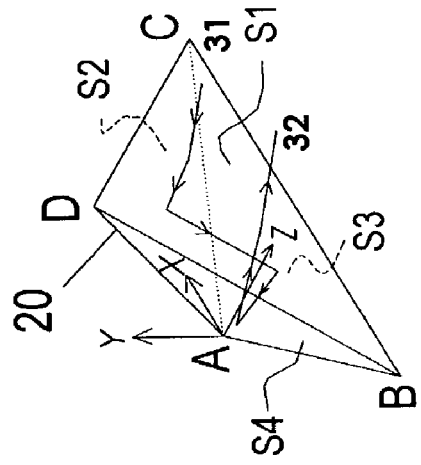
Figure 3A:
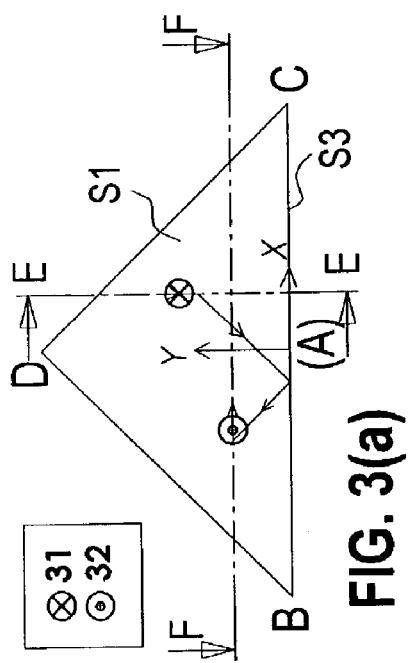
Figure 3F:
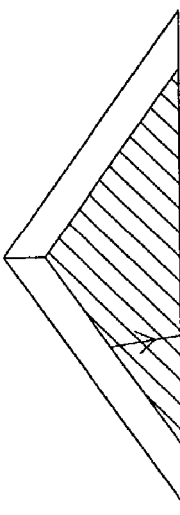
Figure 3C:
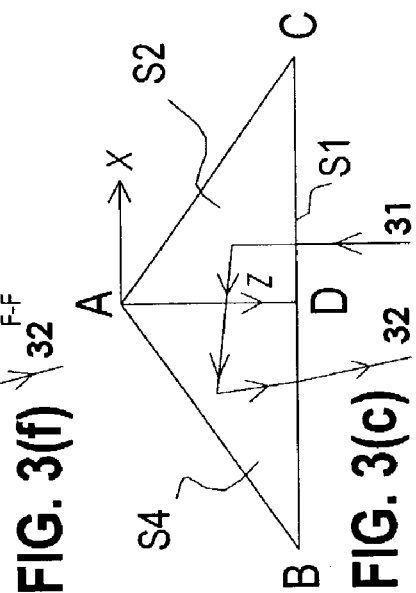

FIGS. 3(a)–3(f) further exhibit the optical path inside an invented HP prism reflector, for an incident beam generally not perpendicular to the entrance surface. Similar to FIGS. 2(a)–2(d), FIG. 3(a) is a front view of the HP prism reflector, FIG. 3(b) is a side view of the apparatus in FIG. 3(a), FIG. 3(c) is a top view of the apparatus in FIG. 3(a), and FIG. 3(d) is a perspective view of the HP prism reflector. FIG. 3(e) and FIG. 3(f) are cross-sectional views taken along lines E—E and F—F in FIG. 3(a), respectively. In FIG. 3(a), Cartesian coordinates X, Y are shown and a Z-axis (not shown) perpendicular to the X- and Y-axes points out of the page. Cartesian coordinates Y, Z are shown in FIG. 3(b) and a X-axis (not shown) perpendicular to the YZ plane points into the page. The YZ plane defines the plane parallel to the plane of incident beam 31 (the E—E plane in FIG. 3(a) and FIG. 3(e)). In FIG. 3(c), Cartesian coordinates X, Z are shown and a Y-axis (not shown) perpendicular to the X- and Z-axes points out of the page. The XZ plane defines the plane parallel to the plane of exit beam 32 (the F—F plane in FIG. 3(a) and FIG. 3(f)).

As shown, a linearly polarized beam 31 is incident at a tilted angle with respect to the Y-axis and Z-axis in a plane (the E—E plane) parallel to the YZ plane. The incident beam 31 is refracted when it enters into the surface s1 (BCD) toward surface s2 (CDA), where the refraction angle is dependent on the refractive indices (air and glass) and the orientation of incident light. The beam is further reflected from the surface s2 to the surface s3. The reflective surface s3 then continually reflects the beam toward the surface s4. The reflective surface s4 redirects the beam toward the surface s1. Finally, the beam is refracted from the surface s1 and exits the HP prism reflector in a plane (the F—F plane) parallel to the XZ plane. As the result of tilted incidence, the exiting beams 32 emerged from the surface s1 has its polarization direction being rotated from the polarization direction of the incoming beam 31, but by an angle generally not equal to 90 degrees (or the exit beam may be elliptically polarized). The arrow tail (a circle with a cross inside) in FIG. 3(a) denotes the beam entrance point on surface s1. The arrowhead (a circle with a dot in it) in FIG. 3(a) denotes the beam exit point on surface s1.

Figure 4:
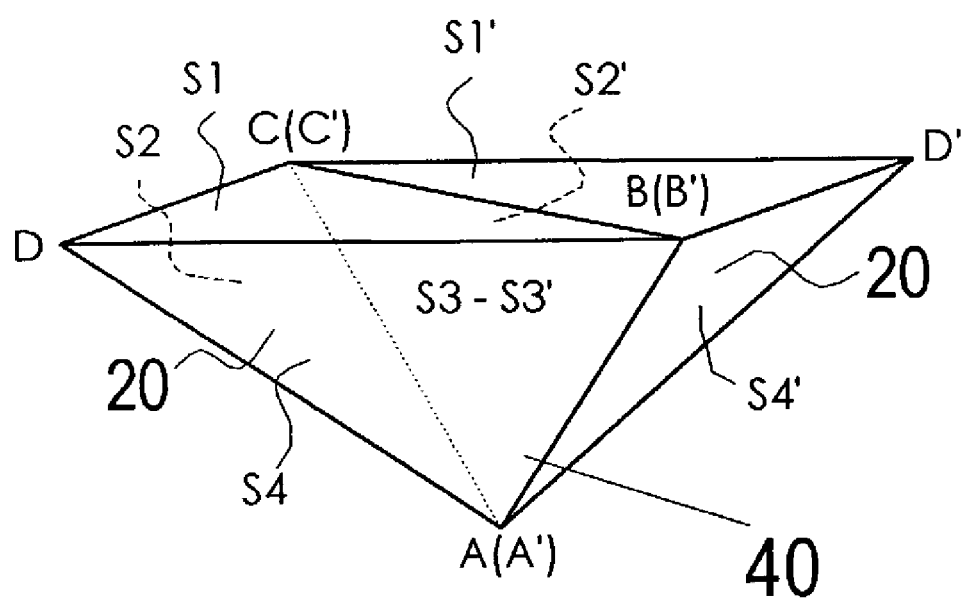
FIG. 4 illustrates a pyramid shaped polarizing converter with a square entrance/exit surface, which comprises an assembly of two HP prism reflectors shown in FIG. 2.

FIG. 4 shows a perspective view of a pyramid shaped polarizing converter 40, which is assembled by two HP prism reflectors (HP prism reflector 20 as shown in FIG. 2), with their side reflective surfaces (s3 in FIG. 2) cemented together and their entrance surfaces (s1 in FIG. 2) coplanar, to form a square shaped entrance/exit surface. The pyramid shaped prism reflector assembly has the similar polarization rotating property of its HP reflector component. In addition, due to its square entrance/exit surface, the pyramid shaped prism reflector 40 is more useful in many practical applications.

Figure 5A:
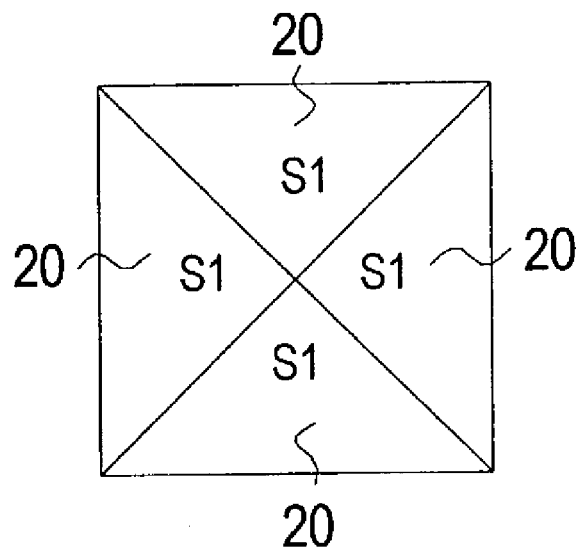
FIGS. 5(a)–5(c) illustrate a variation on the embodiments of a polarizing converter with a square entrance/exit surface, which comprises four HP prism reflectors shown in FIG. 2.
Figure 5B:
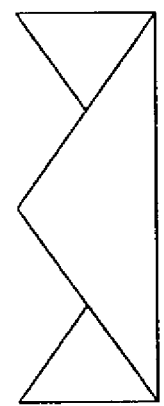
Figure 5C:
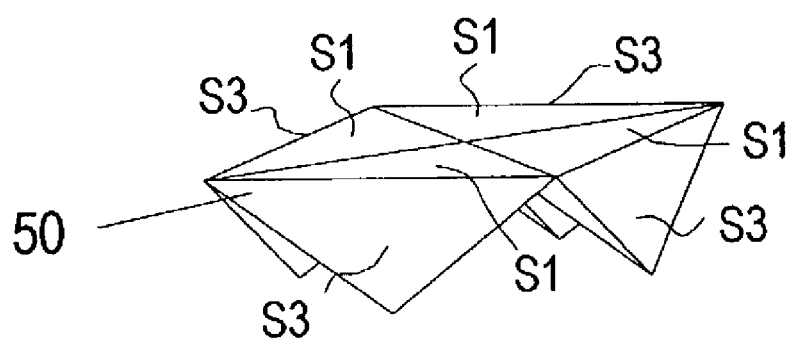
Figure 6A:
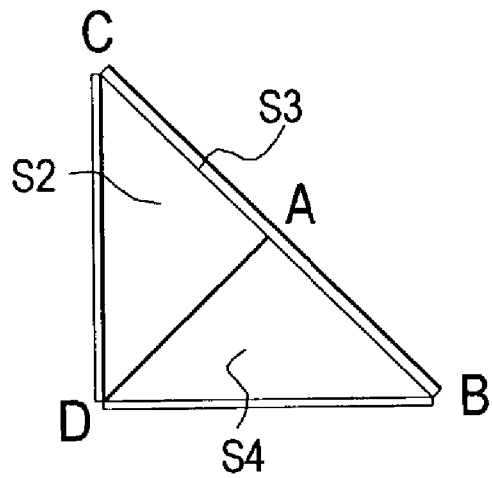
FIGS. 6(a)–6(d) present another embodiment of the invented half pyramid reflector shown in FIG. 1, illustrating the geometry and structure of a disclosed HP hollow reflector being formed by three reflecting mirror plates.
Figure 6B:
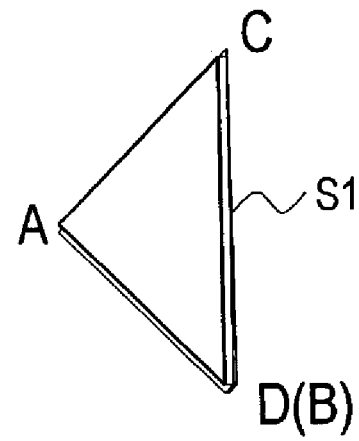
Figure 6C:
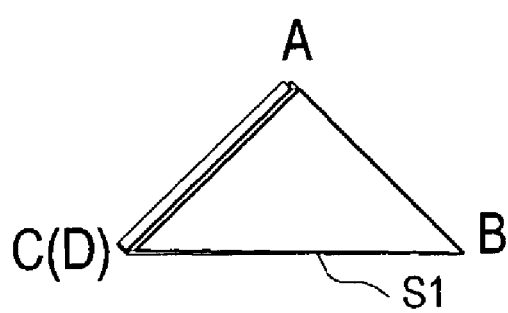
Figure 6D:
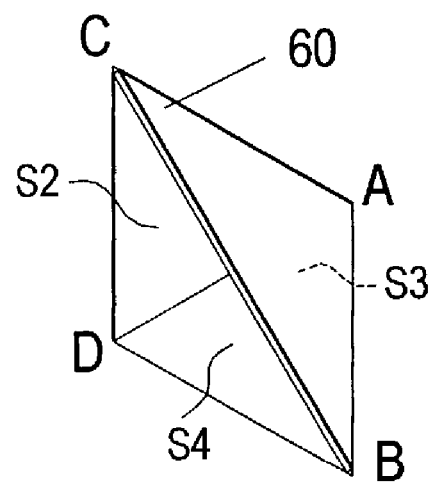

Alternatively, FIGS. 5(a)–5(c) illustrate a variation on the embodiments of a polarizing converter with square entrance/exit surface, which comprises four HP prism reflectors shown in FIG. 2, wherein four isosceles right triangular shaped entrance/exit surfaces of 20 (s1 in FIG. 2) coplanarly jointed together to form a flat square entrance/exit surface, with four reflecting surfaces (s3 in FIG. 2), perpendicular to the entrance/exit surface, facing outside to outline said reflector assembly 50. The operation of the HP reflector assembly is identical to its HP reflector components. FIG. 5(a) is a front view of said prism reflector assembly 50. FIG. 5(b) is a side view and FIG. 5(a). FIG. 5(c) is a perspective view of FIG. 5(a).

Another implementation of the HP reflector, described in FIG. 1, is formed by mirrors cemented together to be shaped in a hollow half pyramid. FIGS. 6(a)–6(d) present a front view, side view, top view and perspective view of a HP hollow reflector 60, according to the invention. A HP hollow reflector is a hollow half pyramid shaped structure with three reflective inner wall surfaces, made up of three mirror plates. The entrance/exit surface s1 (BCD) is an open surface while the surface s2 (CDA), s3 (BAC) and s4 (DBA) are inner reflecting surfaces. The open surface s1 (surface BCD) is the beam entrance/exit surface, in the shape of an isosceles right triangle. The surface s3 is a reflective surface perpendicular to the open surface s1. The triangular surface s2 and s4 are two reflective surfaces, both at a 45 degrees angle respect to surface s1. The surfaces s2, s3 and s4 normally have high reflection coatings. Working on the same principle, a beam perpendicularly incident to open plane s1, reflected three times inside said reflector sequentially by surfaces s2, s3 and s4, will exit open surface s1 in a reversed direction to the incident beam with the polarization direction rotated by 90 degrees.

Figure 7:
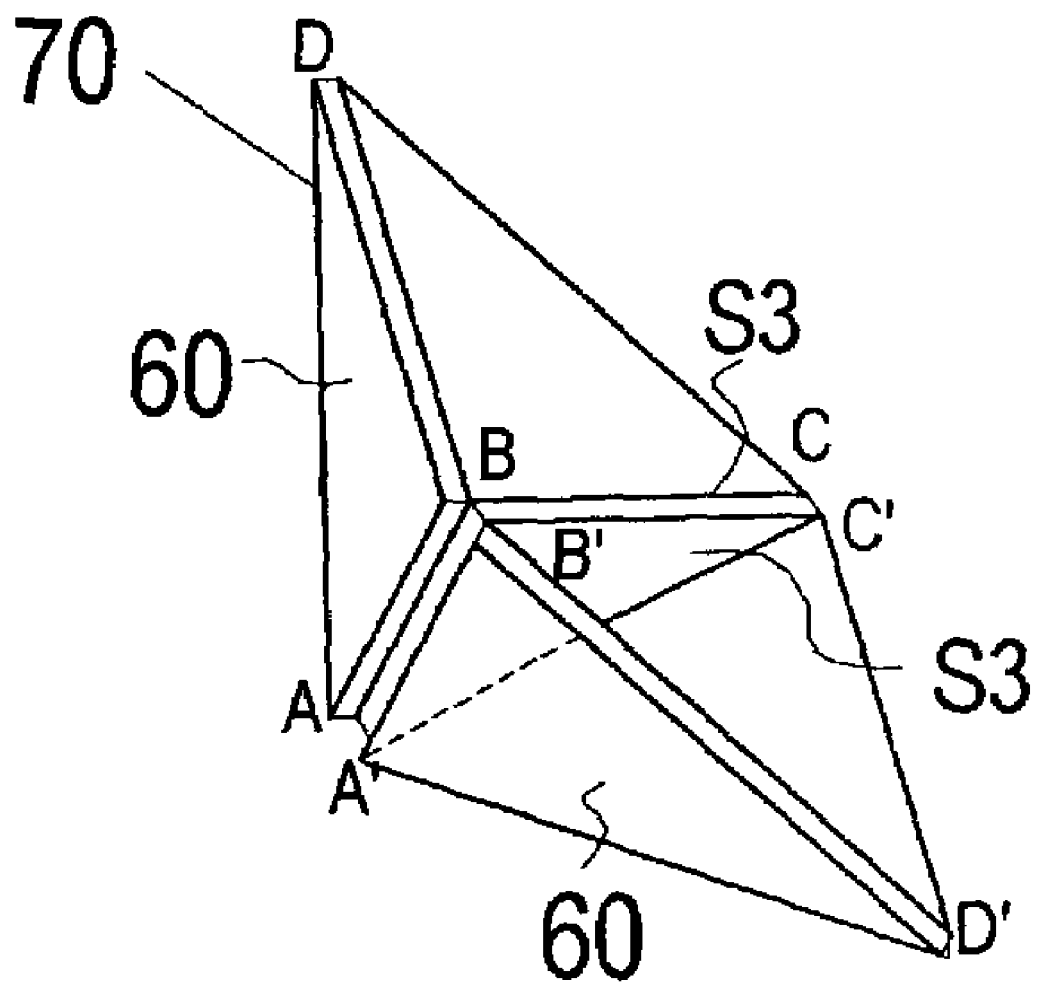
FIG. 7 illustrates a pyramid shaped polarizing converter with a square entrance/exit surface, which comprises an assembly of two HP hollow reflectors as shown in FIG. 6.

Like HP prism reflector 20, HP hollow reflector 60 could also be further assembled in a variety of configurations for different polarization rotation applications. FIG. 7 shows a pyramid shaped polarizing converter 70, which is formed by two HP hollow reflectors 60 shown in FIG. 6, made up of thin reflective mirror plates, with their side plates (s3 in FIG. 6) cemented together and two open surfaces (s1 in FIG. 6) coplanar, to form a square shaped open entrance/exit surface. In practice, two side plates (s3 in FIG. 6) can be replaced by one plate with both sides high-reflection coated.

FIGS. 8(a)–8(c) present another embodiment of a polarizing converter with a square entrance/exit surface, comprising four HP hollow reflectors 60 shown in FIG. 6, wherein four isosceles right triangular shaped open entrance/exit surfaces of 60 (s1 in FIG. 6) coplanarly jointed together to form a flat open square entrance/exit surface, while four reflecting surfaces (s3 in FIG. 6), perpendicular to entrance/exit surface, are facing outside to outline said reflector assembly 80. The working principle of the HP reflector assembly 80 is identical to its HP hollow reflector components. FIG. 8(a) is a front view of said apparatus 80. FIG. 8(b) is a side view of FIG. 8(a). FIG. 8(d) is a perspective view of FIG. 8(a).

FIGS. 9(a)–9(d) present a schematic configuration of a strip polarizing converter 90, comprising multiple pyramid shaped HP prism reflectors 40 shown in FIG. 4, for using in an application where a strip shaped polarizing converter is needed. One of the sample applications will be described in FIG. 12. The element types in said strip reflector include, but are not limited to, the prism reflector assemblies shown in FIG. 4 and FIG. 5, and the hollow reflector assembly shown in FIG. 7 and FIG. 8. The number of the elements in the strip is decided by the actual application. FIG. 9(a) shows a front view of the strip, FIG. 9(b) shows a side view of the apparatus in FIG. 9(a), FIG. 9(c) shows a top view of the apparatus in FIG. 9(a), and FIG. 9(d) shows a perspective view of the strip.

Figure 10A:
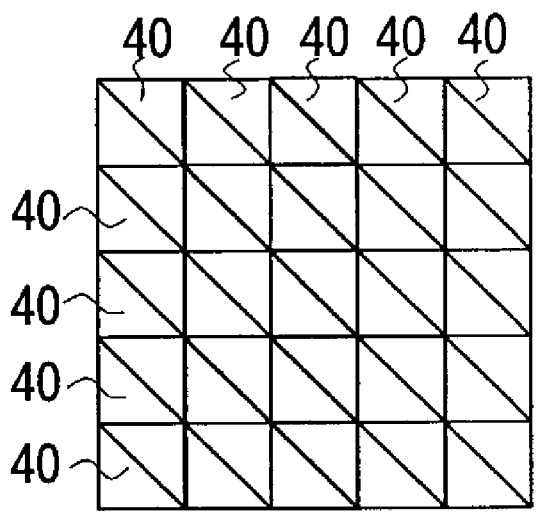
FIGS. 10(a)–10(c) show a schematic configuration of a polarizing converter comprising a HP prism reflector array.
Figure 10B:
Figure 10C:
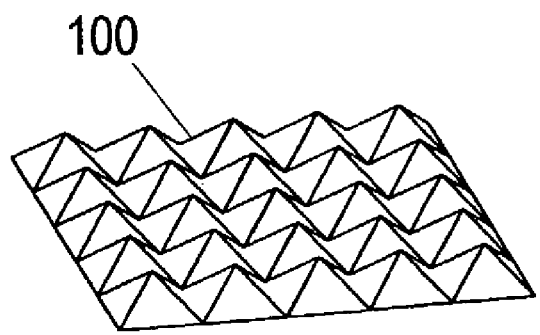

FIGS. 10(a)–10(d) shows a schematic configuration of a HP prism reflector array assembly 100, comprising multiple pyramid prism reflectors 40 shown in FIG. 4. The element types in the array include, but are not limited to, the prism reflector assemblies shown in FIG. 4 and FIG. 5, and the hollow reflector assembly shown in FIG. 7 and FIG. 8. The number of the elements in the array and the shape of the array can be varied, being determined by the requirements of the actual application. The array assembly may reduce the size, weight and cost when the aperture of the polarizing converter is very large. FIG. 10(a) shows a front view of the HP reflector array. FIG. 10(b) shows a side view of the apparatus in FIG. 10(a). FIG. 10(c) shows a perspective view of the HP reflector array in FIG. 10(a).

Figure 11:
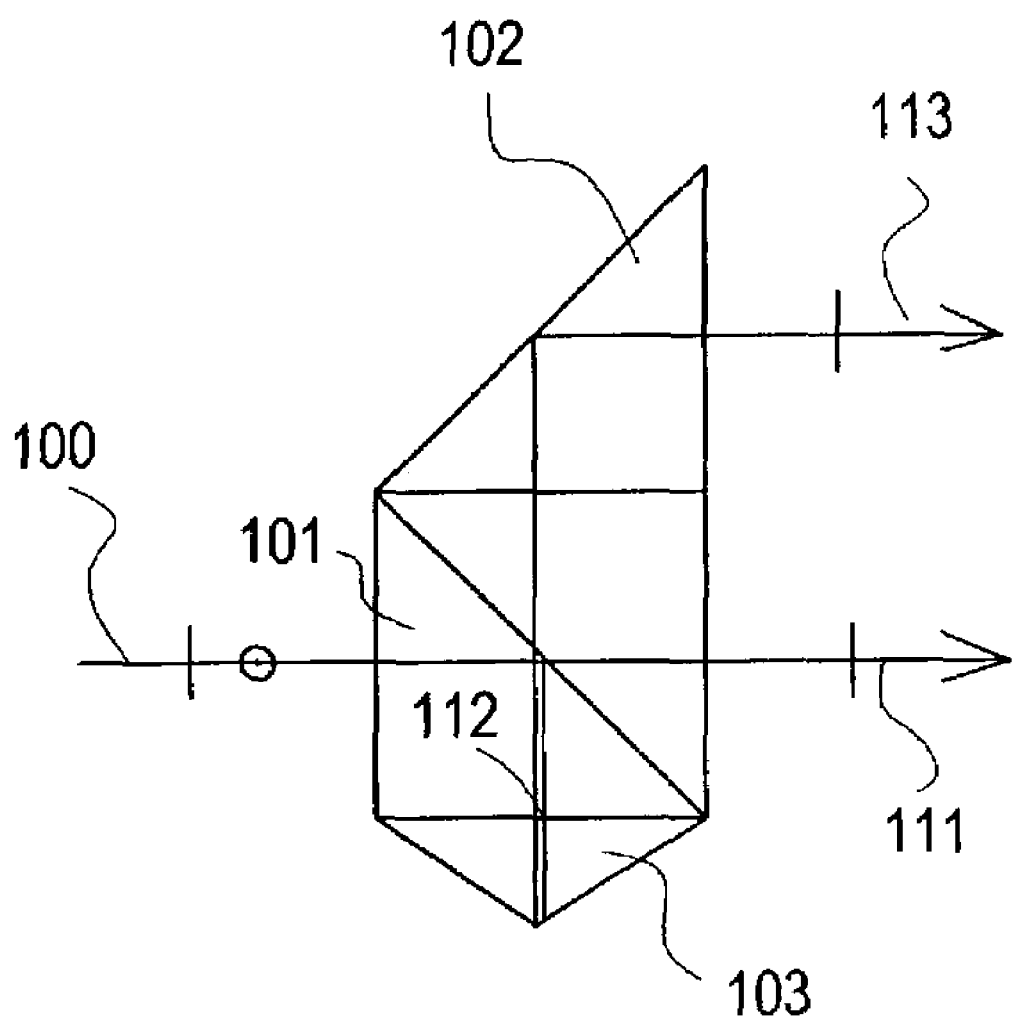
FIG. 11 illustrates the principle of operation for a polarization conversion and recovery system according to an embodiment of the invention, which comprises a pyramid shaped HP prism reflector assembly as shown in FIG. 4, a polarizing beam splitter and a right angle prism.

FIG. 11 illustrates a schematic diagram of a polarization conversion and recovery system with the invented apparatus. The un-polarized light beam 100 is incident to a polarizing beam splitter (PBS) 101. The p-component of the beam 111 passes through the PBS 101, while the s-component 112 is reflected downward and incident to the HP reflector assembly 103, which can be, but is not limited to, any one of the embodiments of the HP prism reflector assembly described above with square entrance surface, such as the prism reflector assemblies shown in FIG. 4 and FIG. 5, the hollow reflector assembly shown in FIG. 7 and FIG. 8, and the prism reflector array shown in FIG. 10. As described in FIG. 1 and FIG. 2, when the collimated incident s-beam strikes the entrance surface of 103, the exiting beam emerging from said reflector 103 has its polarization rotated and becomes a p-polarized beam. Then, the newly p-polarized beam from 103, passing through the PBS 101 and reflected by the right angle prism 102, exits 102 in a desired direction parallel to the p-component 111. Thus, by integrating an invented HP prism reflector assembly in a polarizing converter, the otherwise unused s-component 112 is converted into a p-component 113, with the wanted polarization direction and propagation direction, as shown in FIG. 11.

Figure 12:
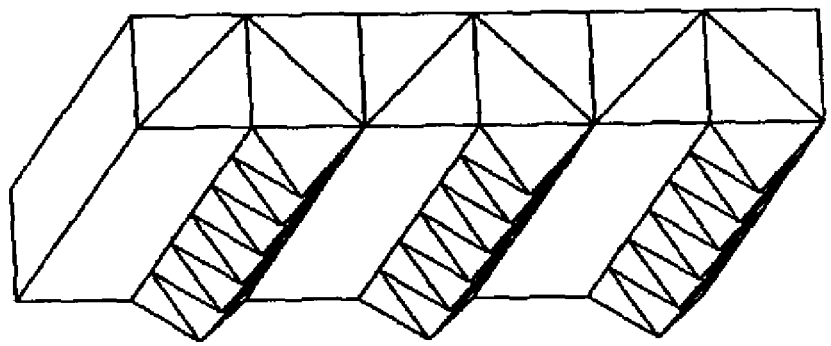
FIGS. 12(a)–12(b) illustrate another schematic configuration of a polarization conversion and recovery system, which comprises-multiple HP prism reflector strips shown in FIG. 9, and multiple polarizing beam splitter prism strips.
Figure 12:
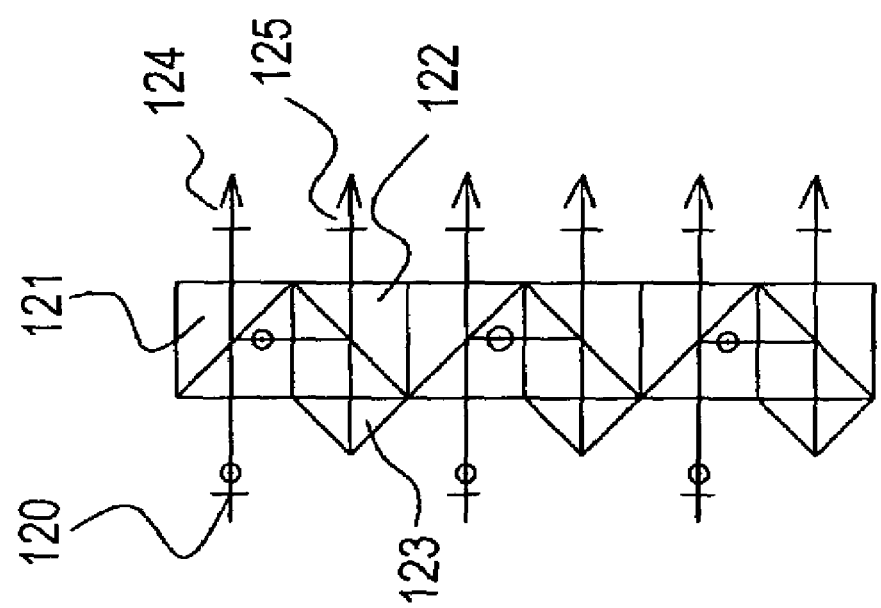

FIG. 12 shows an embodiment of a polarization converting and recovery system with invented HP reflector strips shown in FIG. 9, combined with a PBS strip array and used in a fly-eye lens array polarization converting system. The un-polarizing light beam 120, coming from the fly-eye lens array (not shown in FIG. 12), is incident to the primary PBS strip 121. The p-component 124 of the incident beams passes through the primary PBS strip 121 while the s-component is reflected downward, and is further reflected by the secondary PBS strip 122 onto the HP strip reflector 123. As described before, the exiting beam from 123 becomes p-polarized so it passes through the PBS strip 122. The exiting beam 125 is in a direction parallel to the p-component 124, as shown in FIG. 12(a). The same processes are repeated in the other rows of the PBS strips. As a result, with multiple strip reflector assembly 123 installed in the system, which converts otherwise wasted s-polarization components into p-polarization components and redirects them back to the desired direction, the un-polarized incident light from the fly-eye lens array can be converted into polarized light with high converting efficiency. FIG. 12(a) is a front schematic view of the system and FIG. 12(b) is a perspective schematic view of the system shown in FIG. 12(a).

Figure 13:
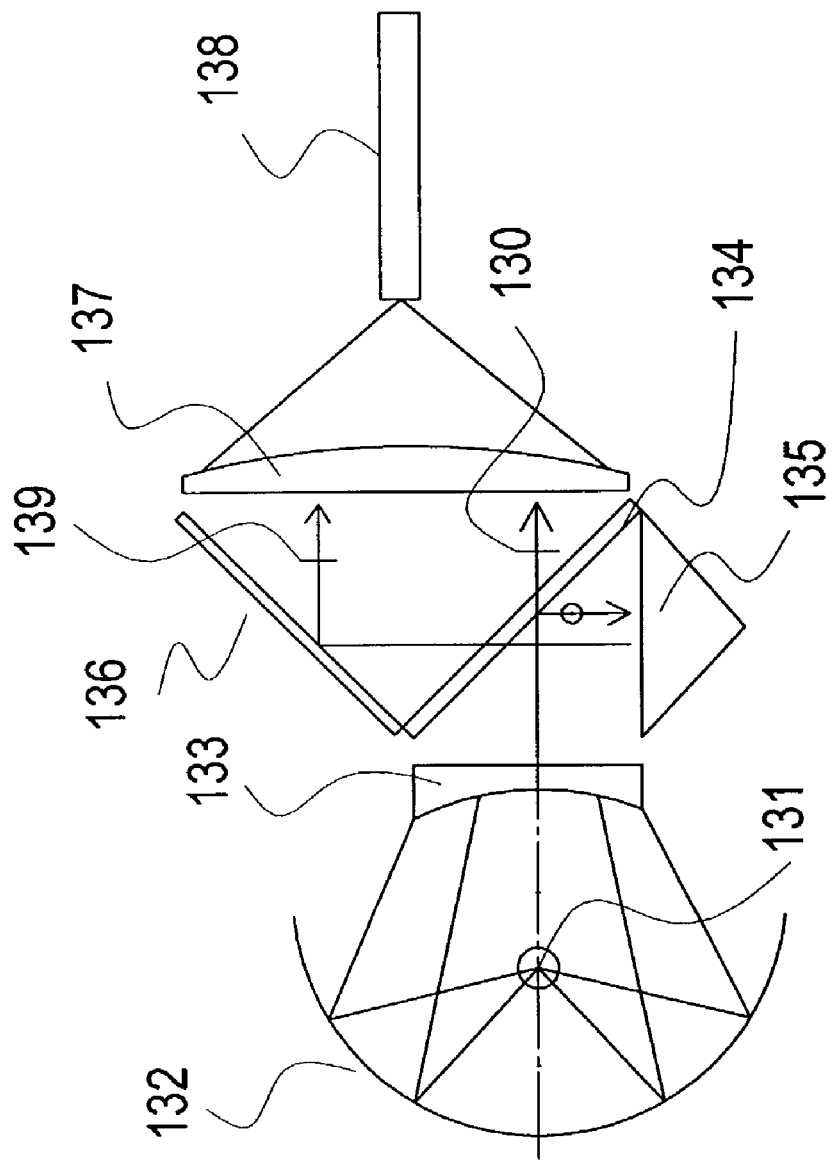
FIG. 13 shows a schematic view of an illumination system for an image projection application utilizing linearly polarized light source. The system consists of a pyramid shaped HP prism assembly, a PBS plate, a reflective mirror, a light source, a collimation lens, a focusing lens and an integrator rod.

FIG. 13 presents another embodiment of the current invention for an application in an image projection system utilizing linearly polarized light source. Light from light source 131 is reflected by an elliptic reflector 132 and then collimated by lens 133. The collimated light exiting from the right side of the lens 133 is incident to a PBS plate 134. The p-component of the incident light 130 passes the PBS plate 134 while the s-component is reflected downwards to HP reflector assembly 135. As described previously, when incident beam to HP reflector assembly 135 is s-polarized, the exiting beam from 135 becomes p-polarized, which passes through the PBS plate 134, and then is reflected by mirror 136, propagating in a direction parallel to the direction of beam 130. The p-polarized beam 139 from mirror 136 and the p-polarized beam 130 from PBS 134 are collected by lens 137 onto the entrance of the integrator rod 138.

For LCD or LCOS based projection applications, the integrator rod 138 in FIG. 13 usually has square or rectangular cross section to match the shape of the light valves panel used in the image projection system. The HP reflector assembly 135 could be, but is not limited to, any one of the embodiments of the HP prism reflector assembly described above with the square entrance surface, such as the prism reflector assemblies shown in FIG. 4 and FIG. 5, the hollow reflector assembly shown in FIG. 7 and FIG. 8, and the prism reflector array shown in FIG. 10. Alternatively, the PBS plate 134, reflecting mirror 136, and integrator rod 138 in FIG. 13 could be replaced with a PBS cube, a right angle prism and an integrator pipe, respectively.

FIGS. 14(a)–14(c) present a polarization recycling system employing a HP hollow reflector assembly for image projection systems utilizing a linearly polarized light source, such as a polarized light source for illuminating LCD or LCOS panels. As shown in FIGS. 14(a)–14(c), a HP hollow reflector assembly 141 of the type shown in FIG. 8, with a small opening 144 in the center for incident light to enter in, is mounted on the top of the light pipe integrator 143, which is assembled by four thin mirror plates to form multiple reflective inner wall surfaces. A PBS plate 142, either a wire grid PBS or another type of reflective PBS plate, is mounted on the bottom of the light pipe integrator 143.

An incident light, passing through the opening 144, is multi-reflected by the reflective inner walls of the light pipe integrator 143 before reaching the reflective PBS plate 142. The p-component of incident beam passes through 142 while the s-component is reflected back onto the inner walls of the light pipe integrator 143. The reflected s-components that enter in the HP hollow reflector assembly 141 will be reflected back from 141 to the light pipe 143, with the direction of polarization being rotated. For a normal incident polarized beam, the beam reflected from 141 becomes p-polarized, while for a tilt incident beam, the beam exiting from 141 may have some portion not totally p-polarized, as described previously (see FIG. 3). The reflected beam from the reflector 141, through multi-reflection inside the pipe 143, travels toward to the PBS plate 142, where the recycled p-components will pass through while residual s-components will be reflected back to 143 for further recycling.

Similar to other embodiments illustrated before, the HP reflector assembly 141 in FIG. 14 is the key component in this polarization recycling system to perform the wanted polarization rotation. The polarization rotation apparatus 141 in FIG. 14 could be made from, but is not limited to, any one of the types of the disclosed HP prism reflector assemblies described beforehand with triangular or square entrance surface, such as the HP prism reflector shown in FIG. 2, the HP hollow reflector in FIG. 6, the prism reflector assemblies shown in FIG. 4 and FIG. 5, the hollow reflector assembly shown in FIG. 7 and FIG. 8, or the prism reflector array shown in FIG. 10, with a small opening in the center to allow light to enter the system. An integrator rod, with a reflective PBS layer at its end, could replace the light pipe integrator 143 and the PBS plate 142. FIG. 14(a) is a cross-sectional view of the system taken along line A—A in FIG. 14 (b). FIG. 14(b) is a side view of the system. FIG. 14(c) is a perspective schematic view of the system.

We claim:

1. A reflector apparatus comprising: a reflector in the shape of a half-pyramid, constructed and arranged such that an incoming polarized beam passing through an entrance/exit surface of said reflector is reflected three times inside the reflector and leaves the same entrance/exit surface of said reflector with the direction of polarization being rotated, further including a prism reflector in the shape of a half-pyramid, which comprises: a transmitting surface in the shape of an isosceles right triangle ms entrance/exit surface; a first reflecting side surface, tilted 45 degrees with respect to said entrance/exit surface, crossing with said entrance/exit surface; a second reflecting side surface, perpendicular to said entrance/exit surface, crossing with said entrance/exit surface and the first reflecting side surface and a third reflecting side surface; and the third reflecting side surface, tilted 45 degrees with respect to said entrance/exit surface, crossing with said entrance/exit surface and the first reflecting side surface and the second reflecting side surface; wherein said apparatus is constructed and arranged such that an incoming polarized beam passing through the entrance/exit surface is reflected three times inside said apparatus and exits from said entrance/exit surface with the direction of polarization being rotated.

2. A reflector apparatus comprising: a reflector in the shape of a half-pyramid, constructed and arranged such that an incoming polarized beam passing through an entrance/exit surface of said reflector is reflected three times inside the reflector and leaves the same entrance/exit surface of said reflector with the direction of polarization being rotated, further including a hollow reflector in the shape of a half-pyramid, which is made of thin reflective mirror plates and comprises: an open surface in the shape of an isosceles right triangle as entrance/exit surface a first mirror plate, tilted 45 degrees with respect to said entrance/exit surface, crossing with said entrance/exit surface and a second mirror plate and a third mirror plate; the second mirror plate, perpendicular to said entrance/exit surface, crossing with said entrance/exit surface and the first mirror plate and a third mirror plate; and the third mirror plate, tilted 45 degrees with respect to said entrance/exit surface, crossing with said entrance/exit surface and the first mirror plate and the second mirror plate; wherein said apparatus is constructed and arranged such that an incoming polarized beam passing through the open entrance/exit surface is reflected three times inside said apparatus and exits from said entrance/exit surface with the direction of polarization being rotated.

3. A method to rotate the direction of polarization of a polarized light beam by using a the reflector apparatus according to claim 1 or 2, wherein a polarized light beam incident upon an entrance/exit surface of said reflector apparatus is reflected three times inside the apparatus and exits from the entrance/exit surface with direction of polarization being rotated.

* * * * *